(12) United States Patent
Kusunose (10) Patent No.: US 10,106,055 B2
(45) Date of Patent: Oct. 23, 2018

(54) VEHICLE CONTROL SYSTEM, PORTABLE TERMINAL, AND VEHICULAR DEVICE

(71) Applicant: DENSO CORPORATION, Kariya, Aichi-pref. (JP)

(72) Inventor: Yuji Kusunose, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 61 days.

(21) Appl. No.: 15/113,852

(22) PCT Filed: Jan. 21, 2015

(86) PCT No.: PCT/JP2015/000257
§ 371 (c)(1),
(2) Date: Jul. 25, 2016

(87) PCT Pub. No.: WO2015/115064
PCT Pub. Date: Aug. 6, 2015

(65) Prior Publication Data
US 2016/0347207 A1    Dec. 1, 2016

(30) Foreign Application Priority Data
Jan. 31, 2014 (JP) .............................. 2014-017390

(51) Int. Cl.
*B60N 2/02* (2006.01)
*H04W 4/80* (2018.01)
(Continued)

(52) U.S. Cl.
CPC ......... *B60N 2/0248* (2013.01); *B60N 2/0228* (2013.01); *B60N 2/12* (2013.01);
(Continued)

(58) Field of Classification Search
CPC ................ B60N 2/0232; B60N 2/0818; B60N 2002/024; B60N 2002/447; B60N 2/50;
(Continued)

(56) References Cited

U.S. PATENT DOCUMENTS

| 4,463,426 A | * | 7/1984 | Caddick | ............... | B60N 2/0232 |
| | | | | | 296/65.16 |
| 5,812,399 A | * | 9/1998 | Judic | .................... | B60N 2/0224 |
| | | | | | 296/65.01 |

(Continued)

FOREIGN PATENT DOCUMENTS

| JP | H05330368 A | 12/1993 |
| JP | 2009125276 A | 6/2009 |

(Continued)

*Primary Examiner* — Jelani A Smith
*Assistant Examiner* — Luis A Martinez Borrero
(74) *Attorney, Agent, or Firm* — Harness, Dickey & Pierce, P.L.C.

(57) ABSTRACT

The present disclosure provides a vehicle control system which is capable of setting sleep positions appropriate for a user in different vehicles. In the vehicle control system, a portable terminal receives inputs of sleep positions each of which is a seat position appropriate for the user to sleep in a corresponding vehicle, a storage stores the sleep positions associated with respective vehicles, and a sleep position transmission portion reads out, from the storage, the sleep position corresponding to the vehicle boarded by the user in response to a manipulation made by the user and transmits the readout sleep position to the corresponding vehicular device. Each vehicular device, in response to a reception of the sleep position from the portable terminal, sets the seat position to be appropriate for the user to sleep in accordance with the received sleep position.

9 Claims, 8 Drawing Sheets (51) Int. Cl.
*B60R 16/037* (2006.01)
*B60N 2/12* (2006.01)
*B60N 2/16* (2006.01)
*G07C 5/04* (2006.01)
*H04W 88/02* (2009.01)

(52) U.S. Cl.
CPC .............. *B60N 2/16* (2013.01); *B60R 16/037* (2013.01); *G07C 5/04* (2013.01); *H04W 4/80* (2018.02); *H04W 88/02* (2013.01)

(58) Field of Classification Search
CPC .... B60N 2/02; B60N 2/0881; B60N 2/42709; B60N 2/0244; B60N 2/0722; H04W 4/008; H04W 4/027; H04W 4/046; H04W 88/02
USPC ............ 701/36, 1, 400, 49, 117, 41, 431, 48
See application file for complete search history.

(56) References Cited

U.S. PATENT DOCUMENTS

| | | | | |
|---|---|---|---|---|
| 8,099,216 B2* | 1/2012 | Matsuura | ............ | B60N 2/0248 701/49 |
| 8,457,846 B2* | 6/2013 | Fischer | ................ | B60N 2/0224 701/36 |
| 9,248,794 B2* | 2/2016 | Chang | ................ | B60R 16/0373 |
| 9,422,058 B2* | 8/2016 | Fischer | ................ | B60N 2/0224 |
| 9,452,692 B1* | 9/2016 | Rawlinson | ............ | B60N 2/062 |
| 9,481,466 B2* | 11/2016 | Fischer | ................ | B60N 2/919 |
| 9,694,770 B2* | 7/2017 | Tobin | ................ | B60R 16/037 |
| 2004/0128065 A1* | 7/2004 | Taylor | ................ | B60C 23/0408 701/431 |
| 2007/0119647 A1* | 5/2007 | Kusunoki | ............ | B60N 2/0252 180/326 |
| 2007/0276568 A1* | 11/2007 | Tozu | .................... | B60N 2/0244 701/49 |
| 2007/0290554 A1* | 12/2007 | Teshima | ............... | B60N 2/0244 307/10.1 |
| 2008/0312796 A1* | 12/2008 | Matsuura | ............ | B60N 2/0248 701/49 |
| 2008/0312797 A1* | 12/2008 | Takehisa | ............ | B60N 2/0244 701/49 |
| 2009/0195040 A1* | 8/2009 | Birkbeck | ............ | A47C 1/03255 297/317 |
| 2011/0282495 A1* | 11/2011 | Fischer | ................ | B60N 2/0224 700/275 |
| 2012/0086249 A1* | 4/2012 | Hotary | .................... | B60N 2/809 297/284.3 |
| 2013/0009761 A1* | 1/2013 | Horseman | ............ | B60W 40/08 340/425.5 |
| 2013/0317704 A1* | 11/2013 | Fischer | ................ | B60N 2/0224 701/49 |
| 2014/0052345 A1* | 2/2014 | Tobin | .................... | B60R 16/037 701/49 |
| 2015/0012186 A1* | 1/2015 | Horseman | ............ | B60W 40/08 701/49 |
| 2015/0375865 A1* | 12/2015 | Fischer | ................. | B60N 2/919 701/49 |
| 2017/0048309 A1* | 2/2017 | Fischer | ................ | B60N 2/0224 |
| 2017/0197523 A1* | 7/2017 | Magana | .................... | B60N 2/90 |

FOREIGN PATENT DOCUMENTS

| | | |
|---|---|---|
| JP | 2010195169 A | 9/2010 |
| JP | 2010214972 A | 9/2010 |
| JP | 2012081925 A | 4/2012 |
| JP | 2013538755 A | 10/2013 |
| WO | WO-2009066593 A1 * | 5/2009 ........... B60N 2/0232 |

* cited by examiner

THIS FUNCTION IS
UNAVAILABLE WHEN
SHIFT POSITION
IS NOT IN P.

VEHICLE CONTROL SYSTEM, PORTABLE TERMINAL, AND VEHICULAR DEVICE

CROSS REFERENCE TO RELATED APPLICATIONS

This application is a U.S. National Phase Application under 35 U.S.C. 371 of International Application No. PCT/JP2015/000257 filed on Jan. 21, 2015 and published in Japanese as WO 2015/115064 A1 on Aug. 6, 2015. This application is based on and claims the benefit of priority from Japanese Patent Application No. 2014-017390 filed on Jan. 31, 2014. The entire disclosures of all of the above applications are incorporated herein by reference.

TECHNICAL FIELD

The present disclosure relates to a vehicle control system, a portable terminal, and a vehicular device each of which automatically sets a driving position in a vehicle.

BACKGROUND ART

Conventionally, a portable device transmitting user's personal information to an onboard device is known. The onboard device receives the personal information and reads out a driving position associated with the personal information from the user's personal information. The onboard device automatically sets a seat position, a steering position, and a mirror surface position of an outer rear view mirror according to the driving positions that are read out (e.g., see patent literature 1).

A driver may need to take a rest appropriately when the driver drives a vehicle for a long time to travel a long distance. The driver may also need to sleep during a rest period in a vehicle compartment by reclining a seat back.

However, the device described in patent literature 1 is not configured to automatically set a sleep position appropriate for a user. The user needs to manually set an appropriate sleep position for each vehicle.

PRIOR ART LITERATURES

Patent Literature

Patent Literature 1: JP 2010-214972 A

SUMMARY OF INVENTION

In view of the foregoing difficulties, it is an object of the present disclosure to provide a vehicle control system, a portable terminal, and a vehicular device each of which is capable of setting sleep positions appropriate for a user corresponding to different vehicles.

According to a first aspect of the present disclosure, a vehicle control system includes a portable terminal carried by a user and a plurality of vehicular devices provided, respectively, for a plurality of vehicles. Each of the plurality of vehicular devices automatically sets a driving position appropriate for a user to perform a driving operation by communicating with the portable terminal. The portable terminal includes an input reception portion receiving inputs of sleep positions each of which is a seat position appropriate for the user to sleep in a corresponding one of the plurality of vehicles, a storage storing the sleep positions received by the input reception portion associated with the plurality of vehicles, and a sleep position transmission portion reading out, from the storage, one of the sleep positions corresponding to one of the plurality of vehicles boarded by the user in response to a manipulation made by the user and transmitting the one of the sleep positions which is read out to a corresponding one of the plurality of vehicular devices. Each of the plurality of vehicular devices includes a sleep position setup portion. When one of the plurality of vehicular devices receives the one of the sleep positions from the portable terminal, the sleep position setup portion automatically sets, in accordance with the one of the sleep positions, the seat position to be appropriate for the user to sleep.

In the above vehicle control system, the portable terminal receives input of a sleep position corresponding to each vehicle. Herein, the sleep position is a seat position set for a user to take a sleep in the vehicle. The portable terminal stores, in the storage, the sleep position corresponding to each vehicle. The portable terminal reads out the driving position corresponding to the vehicle boarded by the user from the storage in response to the user's manipulation. The portable terminal transmits the sleep position to the vehicular device. The vehicular device receives the sleep position from the portable terminal, and automatically sets, according to the received sleep position, a seat position for the user to take a sleep. With this configuration, the user can easily set the sleep position suitable for the user for different vehicles.

According to a second aspect of the present disclosure, a portable terminal communicating with each of a plurality of vehicular devices is provided. The plurality of vehicular devices are provided, respectively, for a plurality of vehicles, and each of the plurality of vehicular devices sets a driving position appropriate for a user to perform a driving operation. The portable terminal includes an input reception portion receiving inputs of sleep positions each of which is a seat position appropriate for the user to sleep in a corresponding one of the plurality of vehicles, a storage storing the sleep positions received by the input reception portion associated with the plurality of vehicles, and a sleep position transmission portion reading out, from the storage, one of the sleep positions corresponding to one of the plurality of vehicles boarded by the user in response to a manipulation made by the user and transmitting the one of the sleep positions which is read out to a corresponding one of the plurality of vehicular devices.

With the above portable terminal, the user can easily set the sleep position suitable for the user for different vehicles.

According to a third aspect of the present disclosure, a vehicular device, which is provided for each of a plurality of vehicles and automatically sets a driving position appropriate for a user to perform a driving operation by communicating with a portable terminal carried by a user, is provided. The portable terminal receives inputs of sleep positions each of which is a seat position appropriate for the user to sleep in a corresponding one of the plurality of vehicles, stores the sleep positions in a storage, and transmits one of the sleep positions corresponding to the vehicle boarded by the user in response to a manipulation made by the user. The vehicular device includes a sleep position setup portion receiving the one of the sleep positions from the portable terminal and automatically setting, in accordance with the one of the sleep positions, the seat position to be appropriate for the user to sleep.

With the above vehicular device, the user can easily set the sleep position suitable for the user for different vehicles.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
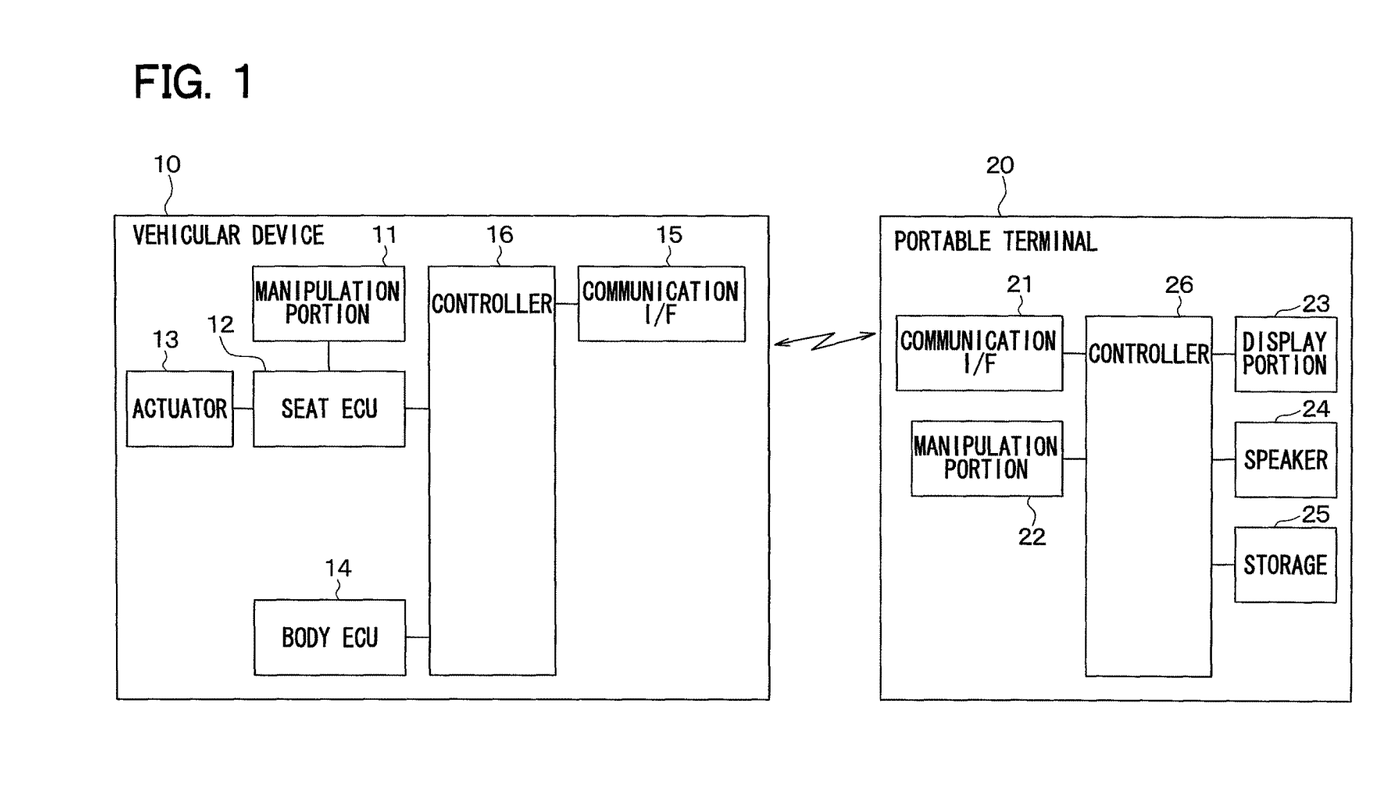
FIG. 1 is a diagram illustrating a configuration of a vehicle control system according to an embodiment of the present disclosure.

FIG. 1 illustrates a configuration of the vehicle control system according to an embodiment of the present disclosure. The vehicle control system includes a portable terminal 20 carried by a user and a vehicular device 10 provided for a vehicle. The vehicle control system uses communication between the portable terminal 20 and the vehicular device 10 to automatically set driving positions appropriate for a user during driving.

The vehicular device 10 includes a manipulation portion 11, a seat Electronic Control Unit (ECU) 12, an actuator 13, a body ECU 14, a communication interface 15, and a controller 16. In the drawings, the communication interface is denoted as communication I/F.

Figure 2:
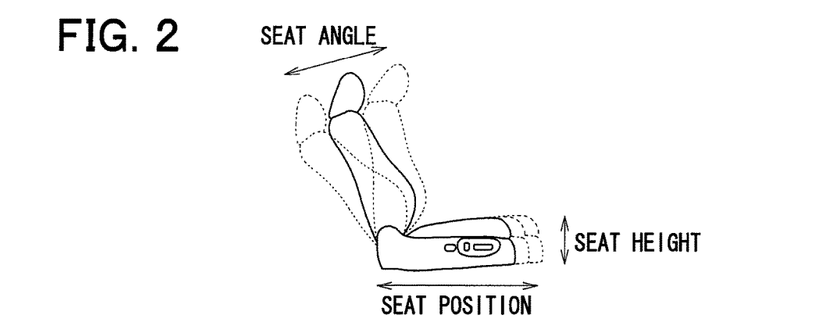
FIG. 2 is a diagram illustrating a seat position, a seat angle, and a seat height of a driver's seat.

In accordance with user manipulation, the manipulation portion 11 outputs a signal to adjust seat positions of the driver's seat in the vehicle. As illustrated in FIG. 2, the driver's seat in the vehicle according to the embodiment can be adjusted by driving the actuator 13 in terms of a position in the front-back direction (seat position), a backrest angle (seat angle), and a height (seat height).

Signals output from the manipulation portion 11 to adjust the driver's seat position include a signal to adjust the position of the driver's seat in the front-back direction in the vehicle, a signal to adjust a backrest angle of the driver's seat in the vehicle, and a signal to adjust a height of the surface of the driver's seat in the vehicle.

The seat ECU 12 adjusts the driver's seat position by driving the actuator 13 based on the signal, which is output from the manipulation portion 11 and input to the seat ECU 12. The signal output from the manipulation portion 11 is a signal for adjusting a position of the driver's seat in the vehicle.

The seat ECU 12 is provided by a computer including a central processing unit (CPU), random access memory (RAM), read-only memory (ROM), and input/output (I/O). The CPU executes various processes based on a program stored in the ROM.

In response to a request from the controller 16, the seat ECU 12 outputs a signal indicating the driver's seat position to the controller 16.

The seat ECU 12 receives a driving position or a sleep position from the controller 16. The driving position is a seat position set for the user during a driving operation of the vehicle. The sleep position is a seat position set for the user to take a sleep on the seat. When receiving the sleep position or the driving position from the controller 16, the seat ECU 12 sets the seat to be positioned in the sleep position or the driving position.

The communication interface 15 performs near field communication with the portable terminal 20. Near field communication is enabled at least with the portable terminal 20 available in a communication range that covers an entire vehicle compartment of a vehicle mounted with the vehicular device 10. Near field communication includes Bluetooth (registered trademark), Wi-Fi (registered trademark), and the like.

The controller 16 is provided by a computer including a CPU, RAM, ROM, and I/O. The CPU 16 executes various processes based on a program stored in the ROM.

The body ECU 14 supplies the controller 16 with shift position information indicating a vehicle's shift lever position and an IG signal indicating the ignition switch state of the vehicle. The shift lever positions include low, second, drive, reverse, and parking.

The portable terminal 20 is provided by a smartphone (highly-functional mobile telephone) carried by a user. The portable terminal 20 includes a communication interface 21, a manipulation portion 22, a display portion 23, a speaker 24, a storage 25, and a controller 26.

The communication interface 21 enables telephone calls, data communication for mail transmission/reception and internet browsing, and near field communication for direct connection to a remote instrument within a short range. Near field communication includes Bluetooth (registered trademark), Wi-Fi (registered trademark), and the like.

The manipulation portion 22 includes various switches such as a touch panel and a mechanical switch. The touch panel is arranged in overlapped manner with a front surface of a display screen of the display portion 23. The mechanical switch is positioned around the display screen of the display portion 23. The manipulation portion 22 outputs, to the controller 26, a signal corresponding to user's manipulation on switch. The speaker 24 outputs sound corresponding to an audio signal output from the controller 26.

The storage 25 uses a rewritable storage medium (e.g., flash memory). The storage 25 is capable of storing download data for various applications provided by an information center connected via a communication line.

The controller 26 is provided by a computer including a CPU, RAM, ROM, and I/O. The CPU executes various processes based on a program stored in the ROM.

The controller 26, by executing processes, makes a telephone call to a remote instrument connected via the communication interface 21, exchanges e-mail with a remote instrument connected via a communication line, stores, in the storage 25, download data for various applications acquired from an information center connected via the communication line, and installs various applications using download data stored in the storage 25.

The portable terminal 20 according to the present embodiment is installed with an alarm application. The alarm application performs near field communication with the vehicular device 10 and automatically sets the driver's seat to a predetermined sleep position for the user to take a sleep. The alarm application also automatically changes the driver's seat from the sleep position to a predetermined driving position at a user-defined alarm time to prompt the user to wake up.

The alarm application requires the user to previously register the driving position and the sleep position to the vehicles which the user may drive. Herein, the driving position is the seat position appropriate for the driving operation, and the sleep position is the seat position appropriate for taking a sleep.

Figure 3:
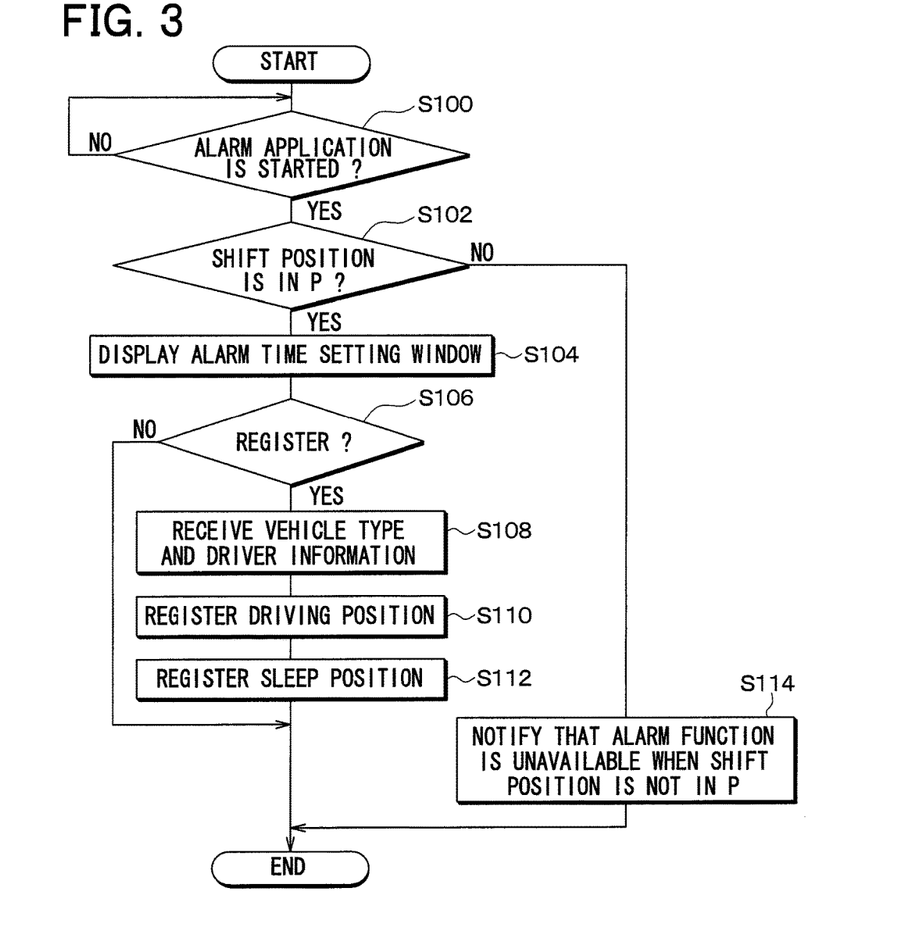
FIG. 3 is a flowchart illustrating a registration process executed by a controller of a portable terminal.

The description below explains a registration process for the driving position and the sleep position. FIG. 3 illustrates a flowchart of the registration process executed by the controller 26 of the portable terminal 20. FIGS. 4A through 4G illustrate display examples generated on the display portion 23 of the portable terminal 20. The controller 26 periodically executes the process in FIG. 3.

Figure 4A:
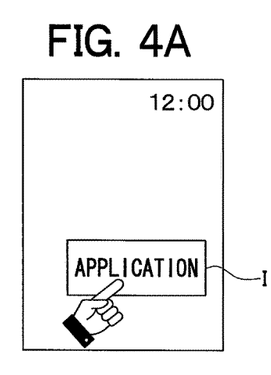
FIGS. 4A through 4G are diagrams illustrating the registration process executed by the controller of the portable terminal.

The controller 26 determines whether the alarm application (S100) is started. Specifically, the controller 26 determines whether the alarm application is started based on the determination whether an icon I for the alarm application is selected by a user from a menu screen as illustrated in FIG. 4A.

When icon I for the alarm application is not selected (S100: NO), the controller 26 repeats the determination at S100.

When icon I for the alarm application is selected (S100: YES), the controller 26 determines whether or not the vehicle's shift lever position is in the parking (P) position (S102). The controller 26 according to the present embodiment requests the vehicular device 10 to transmit shift position information based on near field communication via the communication interface 21. The controller 16 of the vehicular device 10 controls the communication interface 15 to transmit the vehicle's shift position information. The controller 26 acquires the shift position information from the vehicular device 10 and determines whether or not the vehicle's shift lever position corresponds to parking (P), based on the acquired shift position information.

Figure 4B:
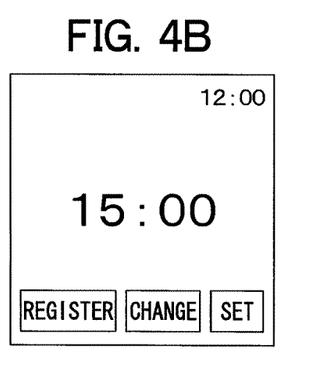

When the vehicle's shift lever position corresponds to parking (P) (S102: YES), the controller 26 controls the display portion 23 to display an alarm time setting window (S104). FIG. 4B illustrates an example of the alarm time setting window. The window displays the alarm time (15:00), the current time (12:00), a "REGISTER" button to register the driving position and the sleep position, a "CHANGE" button to change the vehicle type and the driver name, and a "SET" button to complete the alarm time setting.

The controller 26 determines whether or not to register the driving position and the sleep position (S106). Specifically, the controller 26 determines whether or not to register the driving position and the sleep position, based on the determination whether or not the "REGISTER" button displayed in the alarm time setting window is manipulated by the user.

When the "REGISTER" button included in the window to display the alarm time is not manipulated, the controller 26 repeats the determination at S106.

Figure 4C:
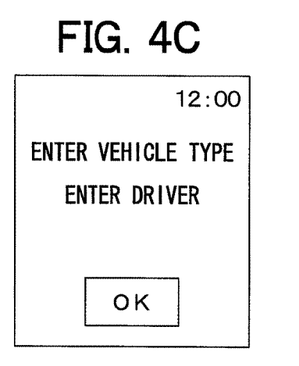

When the "REGISTER" button is manipulated (S106: YES), the controller 26 receives input of the vehicle type and the driver name (S108). Specifically, as illustrated in FIG. 4C, the controller 26 controls the display screen of the display portion 23 to display a window for guiding the user to input the vehicle type and the driver name. The user enters the vehicle type and the driver name by manipulating the manipulation portion 22 according to a displayed instruction on the display screen. The controller 26 stores, in the storage 25, the vehicle type and driver name which are entered by the user.

Figure 4D:
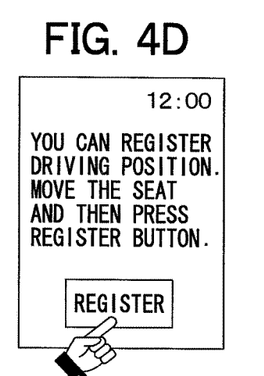

The controller 26 registers the driving position (S110). The controller 26 controls the display screen of the display portion 23 of the portable terminal 20 to display a window to register the driving position as illustrated in FIG. 4D. The registration window displays a message that guides the user to manipulate the "REGISTER" button after adjusting the seat position appropriate for driving operation.

Figure 4E:
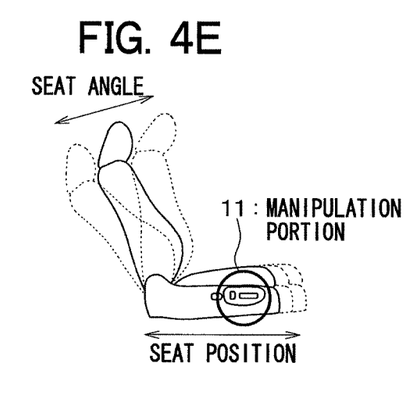

According to the present embodiment, as illustrated in FIG. 4E, the user follows an instruction displayed on the display window and manipulates the manipulation portion 11 to adjust the driver's seat position of the vehicle so that the driver's seat position is suitable for the user to perform driving operation. After completing the adjustment, the user manipulates the "REGISTER" button displayed on the display screen of the display portion 23 of the portable terminal 20.

Suppose that the user manipulates the "REGISTER" button displayed on the display screen of the display portion 23 of the portable terminal 20 under a condition that the driver's seat is adjusted to the position suitable for the user to perform driving operation. The controller 26 of the portable terminal 20 requests the controller 16 of the vehicular device 10 to transmit the driver's seat position. In response to the transmission request, the controller 16 of the vehicular device 10 transmits the driver's seat position via the communication interface 15.

The controller 26 of the portable terminal 20 acquires the driver's seat position from the controller 16 of the vehicular device 10. The controller 26 stores, in the storage 25, the acquired seat position as the driving position in association with the vehicle type and the driver name received at S108.

Figure 4F:
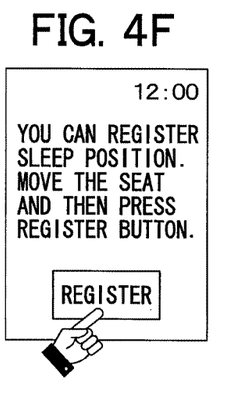

The controller 26 then registers the sleep position (S112). The controller 26 controls the display screen of the display portion 23 of the portable terminal 20 to display a window to register the sleep position as illustrated in FIG. 4F. The registration window displays a message guiding the user to manipulate the "REGISTER" button after adjusting the seat to a seat position appropriate for the user to take a sleep.

Figure 4G:
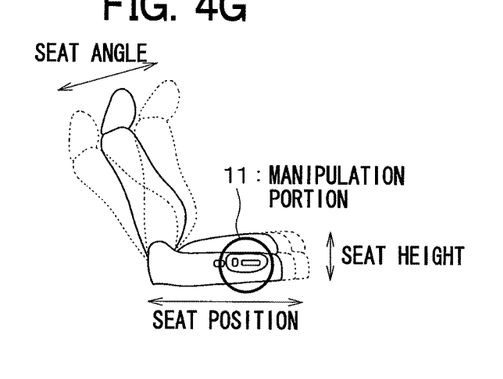

As illustrated in FIG. 4G, similarly to the registration of the driving position, the user manipulates the manipulation portion 11 to adjust the driver's seat position of the vehicle so that the driver's seat position is suitable for the user to take a sleep. After completing the adjustment, the user manipulates the "REGISTER" button displayed on the display screen of the display portion 23 of the portable terminal 20. The controller 26 of the portable terminal 20 requests the controller 16 of the vehicular device 10 to transmit the driver's seat position. In response to the transmission request, the controller 16 of the vehicular device 10 transmits the driver's seat position via the communication interface 15.

The controller 26 of the portable terminal 20 acquires the driver's seat position from the controller 16 of the vehicular device 10. The controller 26 stores, in the storage 25, the acquired seat position as the sleep position in association with the vehicle type and the driver name received at S108. The controller 26 then ends the process.

Figure 5:
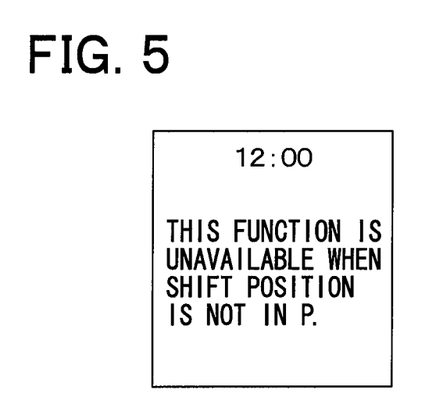
FIG. 5 is a diagram showing an example of a display window during the registration process executed by the controller of the portable terminal.

When the vehicle's shift lever position does not correspond to parking (P) (S102: NO) after the start of alarm application is determined, the controller 26 controls the display screen of the display portion 23 to display a message as illustrated in FIG. 5 notifying that the alarm function is unavailable when the shift position does not correspond to parking (P) (S114). The controller 26 then ends the process.

Figure 6:
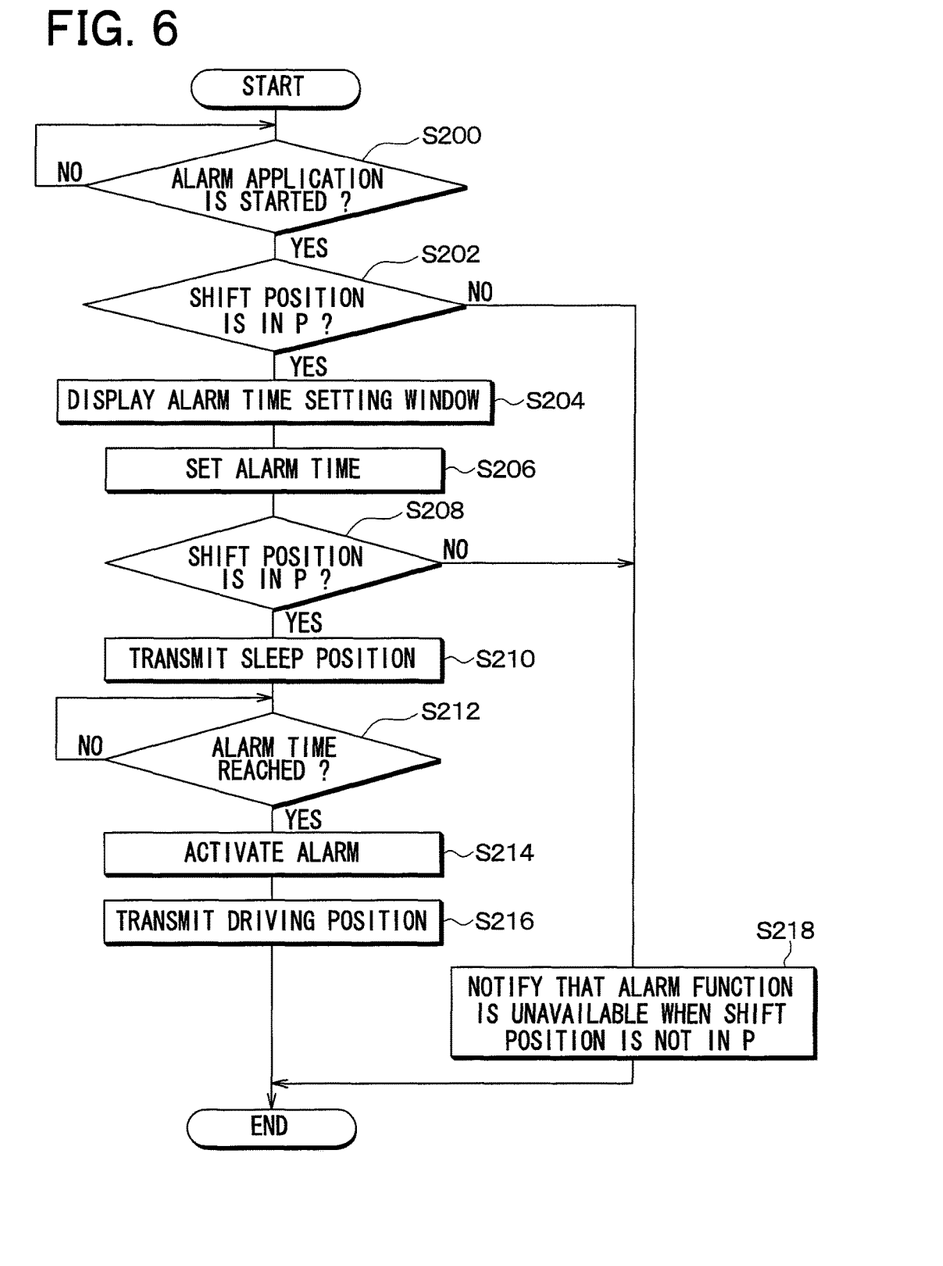
FIG. 6 is a flowchart illustrating an automatic seat position setup process executed by the controller of the portable terminal.

The description below explains an automatic seat position setup process executed by the controller 26 of the portable terminal 20. FIG. 6 is a flowchart illustrating the automatic seat position setup process. FIGS. 7A through 10 illustrate examples of display windows displayed on the display portion 23 of the portable terminal 20. The controller 26 periodically executes the process in FIG. 6.

Figure 7A:
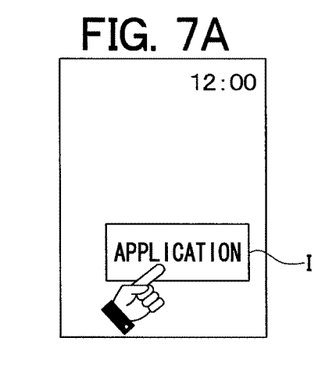
FIGS. 7A through 7F are diagrams showing examples of display windows during the registration process executed by the controller of the portable terminal.

The controller 26 determines whether the alarm application is started (S200). Specifically, the controller 26 determines whether the alarm application is started based on the determination whether an icon I for the alarm application is selected from a menu screen as illustrated in FIG. 7A.

When the icon I for the alarm application is not selected (S200: NO), the controller 26 repeats the determination at S200.

When the icon I for the alarm application is selected (S200: YES), the controller 26 determines whether or not the vehicle's shift lever position corresponds to parking (P) (S202). Specifically, the controller 26 acquires the vehicle's shift position information from the controller 16 of the vehicular device 10, and determines whether or not the vehicle's shift lever position corresponds to parking (P) based on the acquired shift position information.

Figure 7B:
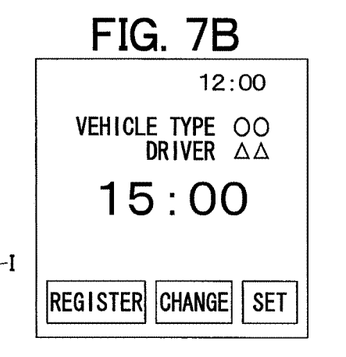

When the vehicle's shift lever position corresponds to parking (P) (S202: YES), the controller 26 controls the display portion 23 to display an alarm time setting window (S204). FIG. 7B illustrates an example of the alarm time setting window.

Figure 8:
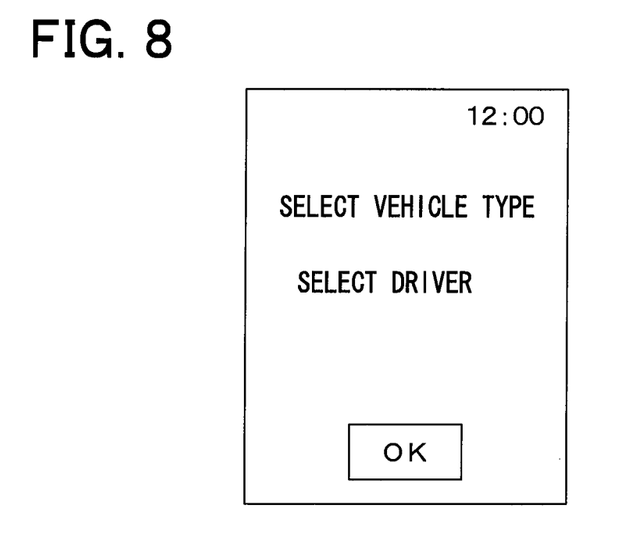
FIG. 8 is a diagram showing an example of a display window during the registration process executed by the controller of the portable terminal.
Figure 9:
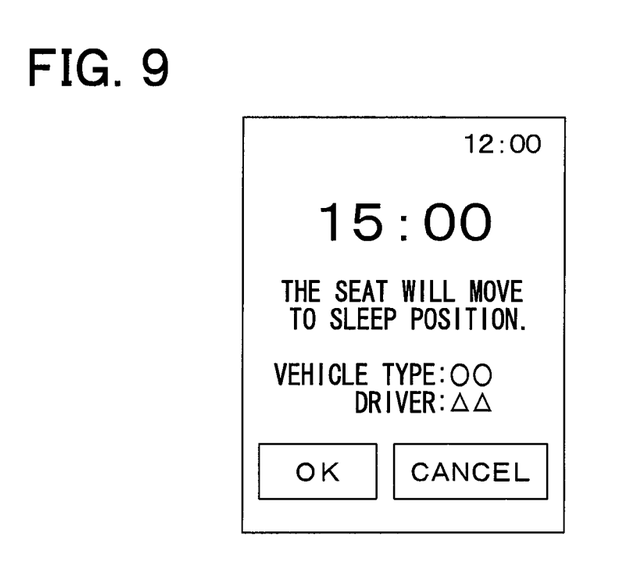
FIG. 9 is a diagram showing an example of a display window during the registration process executed by the controller of the portable terminal.

The controller 26 sets the alarm time (S206). The user can manipulate the "CHANGE" button to change the vehicle type and the driver name. When the "CHANGE" button is manipulated, the controller 26 controls the display screen of the display portion 23 to display a change window as illustrated in FIG. 8 and receives a request to change the vehicle type and the driver name. The user manipulates the "OK" button after completing the input of alarm time.

When the user manipulates the "OK" button, the controller 26 again determines whether or not the vehicle's shift lever position corresponds to parking (P) (S208). Specifically, the controller 26 acquires the vehicle's shift position information from the controller 16 of the vehicular device 10, and determines whether or not the vehicle's shift lever position corresponds to parking (P) based on the acquired shift position information.

Figure 7C:
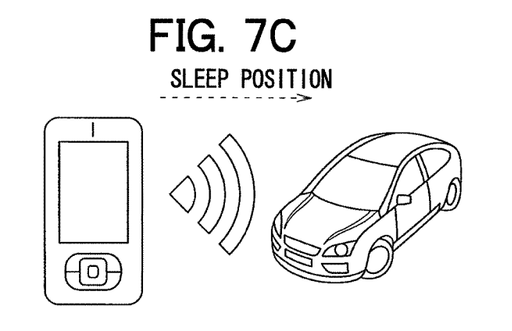

When the vehicle's shift lever position may correspond to parking (P) (S208: YES), as shown in FIG. 7C, the controller 26 transmits the sleep position to the vehicular device 10 (S210). Specifically, the controller 26 reads out the sleep position from the storage 25. The sleep position is associated with the vehicle type and the driver name specified on the alarm time setup screen. The controller 26 transmits the sleep position to the vehicular device 10 via the communication interface 21.

In response to the transmission of the sleep position, the driver's seat immediately starts moving for adjusting the proper seat position. Thus, before transmitting the sleep position, the controller 26 controls the display portion 23 to display a warning window illustrated in FIG. 9. The user manipulates the "OK" button to allow transition to the sleep position. The user manipulates the "CANCEL" button to stop transition to the sleep position. The controller 26 transmits the sleep position when the "OK" button is manipulated. The controller 26 forbids transmitting of the sleep position when the "CANCEL" button is manipulated. The description below assumes that the "OK" button is manipulated by the user.

Figures 7D, 7E:
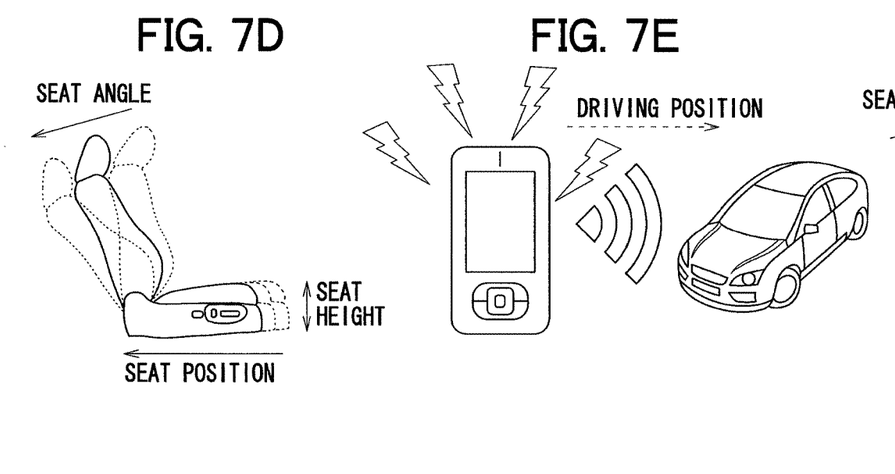

When receiving the sleep position from the portable terminal 20, the vehicular device 10 drives the actuator 13 to automatically set, according to the received sleep position, the appropriate seat position for the user to take a sleep as illustrated in FIG. 7D.

The controller 26 of the portable terminal 20 determines whether or not the alarm time is reached (S212). Specifically, the controller 26 determines whether or not the current time reaches the preliminarily set alarm time.

The controller 26 repeats the determination at S212 when the current time does not reach the alarm time (S212: NO).

Figure 10:
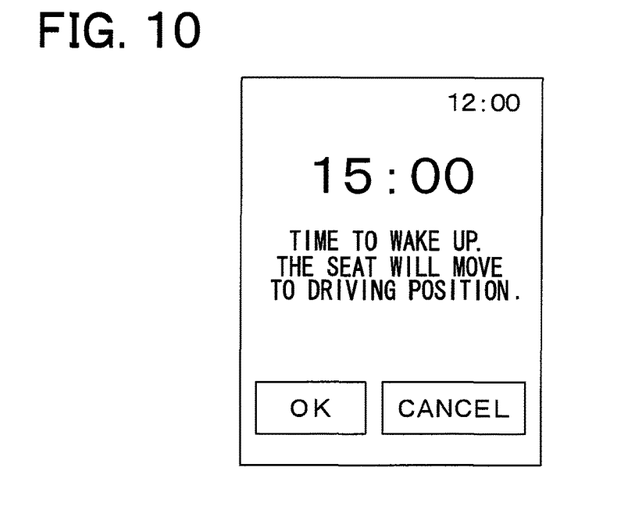
FIG. 10 is a diagram showing an example of a display window during the registration process executed by the controller of the portable terminal.

When the current time reaches the alarm time (S212: YES), the controller 26 activates the alarm operation and controls the speaker 24 to output a predetermined alarm sound as illustrated in FIG. 7E (S214). The controller 26 controls the display portion 23 to display a warning screen as illustrated in FIG. 10. In this case, the user may manipulate the "OK" button to allow transition to the driving position, or may manipulate the "CANCEL" button to stop transition to the driving position. The controller 26 transmits the driving position when the "OK" button is manipulated. The controller 26 forbids transmitting of the driving position when the "CANCEL" button is manipulated. The description below assumes that the "OK" button is manipulated.

The controller 26 transmits the driving position to the vehicular device 10 (S216). Specifically, the controller 26 reads out the driving position from the storage 25. In this case, the readout driving position is related to the vehicle boarded by the user. The controller 26 transmits the readout driving position to the vehicular device 10 based on near field communication of the communication interface 21.

Figure 7F:
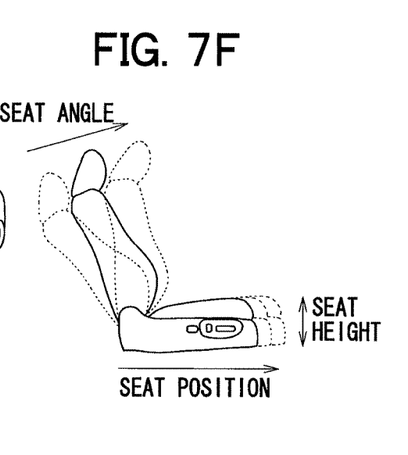

The controller 16 of the vehicular device 10 receives the driving position from the portable terminal 20 via the communication interface 15. The controller 16 then drives the actuator 13 to adjust the driver's seat position according to the received driving position as illustrated in FIG. 7F.

At S200, when the shift lever position does not correspond to parking (P) after the start of alarm application is determined, the controller 26 controls the display screen of the display portion 23 to display a message as illustrated in FIG. 5 notifying that the alarm function is unavailable when the shift position does not correspond to parking (P) (S218). The controller 26 then ends the process.

After the user manipulates the "SET" button on the alarm time setting window at S206, when the shift lever position switches to other position except parking (P), the controller 26 controls the display screen of the display portion 23 to display the message as illustrated in FIG. 5 (S218) and then ends the process.

Compared to the driving position, in the sleep position, the backrest of the driver's seat form an angle approximate to be horizontal and the driver's seat is positioned backward in the front-back direction of the vehicle.

When the current time reaches the alarm time, the portable terminal 20 generates an alarm sound, and the backrest of the driver's seat rises and the driver's seat moves forward to prompt the user to wake up.

Figure 11:
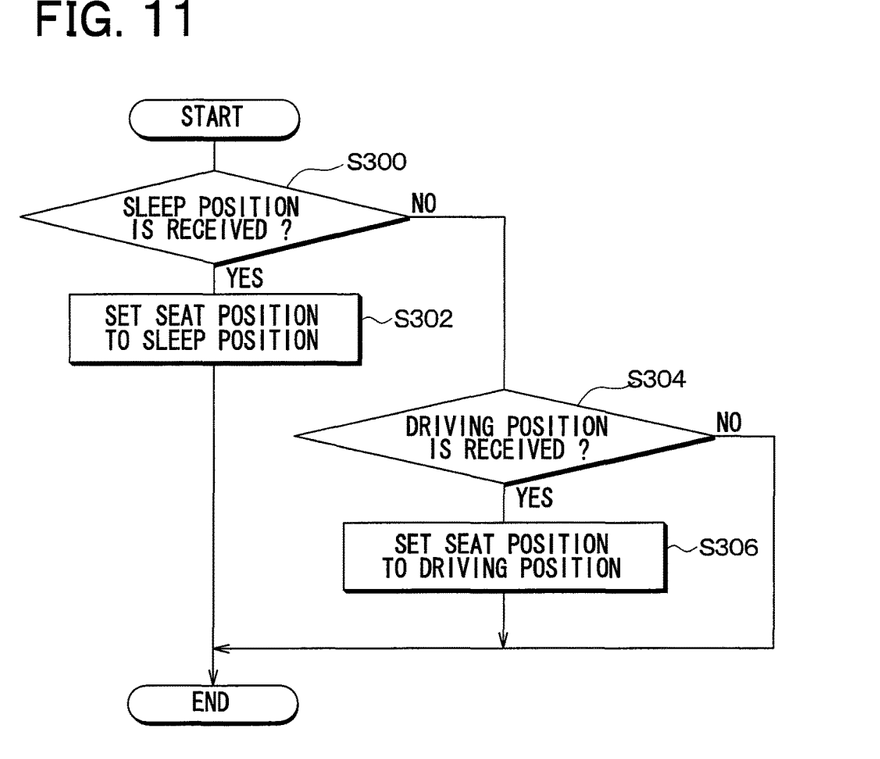
FIG. 11 is a flowchart illustrating a controller of a vehicular device.

The description below explains a process executed by the controller 16 of the vehicular device 10. FIG. 11 illustrates a flowchart for the controller 16. The controller 16 periodically executes the process in FIG. 11 regardless of the state of the vehicle's ignition switch.

The controller 16 determines whether the sleep position is received (S300). Specifically, the controller 16 determines whether the sleep position is received from the portable terminal 20 via the communication interface 15.

When the sleep position is received, the controller 16 drives the actuator 13 and sets the driver's seat position in the vehicle to meet the received sleep position (S302). The controller 16 then ends the process.

When the sleep position is not received (S300: NO), the controller 16 determines whether the driving position is received (S304). Specifically, the controller 16 determines whether the driving position is received from the portable terminal 20 via the communication interface 15.

When the driving position is received, the controller 16 drives the actuator 13 and sets the driver's seat position in the vehicle to meet the received driving position (S306). The controller 16 then ends the process.

When the manipulation portion 11 is manipulated, the controller 16 of the vehicular device 10 executes a process other than the process to drive the actuator 13 in accordance with the manipulation on the manipulation portion 11 and adjust the driver's seat position in the vehicle.

According to the above configuration, the portable terminal 20 receives input of the sleep position, which is a seat position appropriate for the user to take a sleep in a vehicle. The portable terminal 20 may receive multiple sleep positions corresponding to multiple vehicles. The portable terminal 20 stores, in the storage 25, the sleep position corresponding to each vehicle. In response to the user manipulation, the portable terminal 20 reads out the sleep position from the storage 25. The sleep position corresponds to the vehicle boarded by the user. The portable terminal 20 transmits the sleep position to the vehicular device 10 equipped to the vehicle boarded by the user. The vehicular device 10 equipped to the vehicle boarded by the user receives the sleep position from the portable terminal 20. The vehicular device 10 automatically sets the seat position according to the received sleep position for the user to take a sleep. With this configuration, the user can easily set the sleep position suitable for the user in different vehicles.

During a driving of the vehicle, when the sleep position is transmitted from the portable terminal 20 to the vehicular device, the driver's seat will move to the sleep position in response to the received sleep position. This may pose a safety issue. Regarding this, the portable terminal 20 according to the above configuration acquires the shift position information indicating the vehicle's shift lever position and determines whether the vehicle's shift lever position corresponds to parking based on the shift position information. The portable terminal 20 transmits the sleep position to the vehicular device under a condition that the vehicle's shift lever position is determined to correspond to parking. This can prevent the driver's seat from moving to the sleep position during driving of the vehicle.

The storage stores the driving position as a seat position appropriate for the user to perform driving operation. The portable terminal 20 determines whether or not the wakeup time specified by the user manipulation is reached. When determining that the predetermined wakeup time is reached, the portable terminal 20 reads out the driving position corresponding to the vehicle boarded by the user from the storage. The portable terminal 20 transmits the driving position to the vehicular device. The vehicular device 10 receives the driving position from the portable terminal 20 and sets the received driving position as a driving position for the user to drive in accordance with the driving position. This configuration can more reliably prompt the user to wake up compared with a case in which only the alarm sound is used to prompt the user to wake up.

The portable terminal 20 generates an alarm sound from the speaker when determining that the wakeup time is reached. This can much more reliably prompt the user to wake up.

The present disclosure is not limited to the above-mentioned embodiment but may be variously modified within the spirit and scope of the present disclosure, as will be described below.

In the foregoing embodiment, the seat position of the driver's seat is automatically set to the sleep position or to the driving position. As another example, a seat position of a passenger's seat may be automatically set to a sleep position or to a driving position instead of or in addition to the driver's seat.

The foregoing embodiment automatically sets the seat position of the driver's seat to the sleep position or to the driving position. As another example, an embodiment may automatically set a vehicle equipment position, such as a steering position and a mirror surface position of an outer rear view mirror to a position corresponding to sleep state or driving state instead of or in addition to the driver's seat position.

In the foregoing embodiment, the portable terminal 20 is provided by a smartphone. As another example, the portable terminal 20 may be provided by a terminal such as a dedicated portable device, a mobile telephone, a tablet terminal, and a personal digital assistance (PDA), other than the smartphone.

In the foregoing embodiment, the process executed at S108 corresponds to an input reception portion. The process executed at S210 corresponds to a sleep position transmission portion. The process executed at S302 corresponds to a sleep position setup portion. The process executed at S208 and S262 corresponds to a shift position information acquisition portion and a parking determination portion. The process executed at S212 corresponds to a wakeup time determination portion. The process executed at S216 corresponds to a driving position transmission portion. The process executed at S306 corresponds to a driving position setup portion. The process executed at S214 corresponds to an alarm sound output portion.

It is noted that a flowchart or the processing of the flowchart in the present disclosure includes sections (also referred to as steps), each of which is represented, for instance, as S100. Further, each section can be divided into several sub-sections while several sections can be combined into a single section. Furthermore, each of thus configured sections can be also referred to as a circuit, device, module, or means.

Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

What is claimed is:

1. A vehicle control system comprising:
   a portable terminal carried by a user; and
   a plurality of vehicular devices provided, respectively, for a plurality of vehicles, wherein,
   each of the plurality of vehicular devices automatically sets a driving position appropriate for a user to perform a driving operation by communicating with the portable terminal,
   the portable terminal includes:
      an input reception portion receiving inputs of sleep positions each of which is a seat position appropriate for the user to sleep in a corresponding one of the plurality of vehicles;
      a storage storing the sleep positions received by the input reception portion associated with the plurality of vehicles; and
      a sleep position transmission portion reading out, from the storage, one of the sleep positions corresponding to one of the plurality of vehicles boarded by the user in response to a manipulation made by the user and transmitting the one of the sleep positions which is read out to a corresponding one of the plurality of vehicular devices,
   each of the plurality of vehicular devices includes a sleep position setup portion, and,
   when one of the plurality of vehicular devices receives the one of the sleep positions from the portable terminal, the sleep position setup portion automatically sets, in accordance with the one of the sleep positions, the seat position to be appropriate for the user to sleep,
   wherein the sleep position transmission portion transmits the one of the sleep positions to the corresponding one of the plurality of vehicular devices when a shift lever of the one of the plurality of vehicles boarded by the user corresponds to a parking position.

2. The vehicle control system according to claim 1, wherein
   the portable terminal further includes:
      a shift position information acquisition portion acquiring shift position information indicating a position of the shift lever of the one of the plurality of vehicles boarded by the user from the corresponding one of the plurality of vehicular devices; and
      a parking determination portion determining whether the shift lever of the one of the plurality of vehicles boarded by the user corresponds to the parking position based on the shift position information acquired by the shift position information acquisition portion,
      wherein the sleep position transmission portion transmits the one of the sleep positions to the corresponding one of the plurality of vehicular devices under a condition that the parking determination portion determines that the shift lever of the one of the plurality of vehicles boarded by the user corresponds to the parking position.

3. The vehicle control system according to claim 1, wherein
   the storage stores driving positions each of which is a seat position appropriate for the user to perform the driving operation of the corresponding one of the plurality of vehicles,
   the portable terminal further includes:
      a wakeup time determination portion determining whether a current time reaches a wakeup time set by a manipulation made by the user; and
      a driving position transmission portion reading out, from the storage, one of the driving positions corresponding to one of the plurality of vehicles boarded by the user when the wakeup time determination portion determines that the current time reaches the wakeup time, and then the driving position transmission portion transmitting the one of the driving positions which is read out to the corresponding one of the plurality of vehicular devices, and
   each of the plurality of vehicular devices further includes a driving position setup portion receiving the one of the driving positions from the portable terminal and setting, in accordance with the one of the driving positions, the seat position to be appropriate for the user to perform the driving operation.

4. The vehicle control system according to claim 3, wherein
   the portable terminal further includes an alarm sound output portion outputting an alarm sound from a speaker when the wakeup time determination portion determines that the current time reaches the wakeup time.

5. A portable terminal communicating with each of a plurality of vehicular devices which are provided, respectively, for a plurality of vehicles, wherein each of the plurality of vehicular devices sets a driving position appropriate for a user to perform a driving operation,
   the portable terminal comprising:
      an input reception portion receiving inputs of sleep positions each of which is a seat position appropriate for the user to sleep in a corresponding one of the plurality of vehicles;
      a storage storing the sleep positions received by the input reception portion associated with the plurality of vehicles; and
      a sleep position transmission portion reading out, from the storage, one of the sleep positions corresponding to one of the plurality of vehicles boarded by the user in response to a manipulation made by the user and transmitting the one of the sleep positions which is read out to a corresponding one of the plurality of vehicular devices,
   wherein the sleep position transmission portion transmits the one of the sleep positions to the corresponding one of the plurality of vehicular devices when a shift lever of the one of the plurality of vehicles boarded by the user corresponds to a parking position.

6. The portable terminal according to claim 5, further comprising:
   a shift position information acquisition portion acquiring shift position information indicating a position of the shift lever of the one of the plurality of vehicles boarded by the user from the corresponding one of the plurality of vehicular devices; and
   a parking determination portion determining whether the shift lever of the one of the plurality of vehicles boarded by the user corresponds to the parking position based on the shift position information acquired by the shift position information acquisition portion,
   wherein the sleep position transmission portion transmits the one of the sleep positions to the corresponding one of the plurality of vehicular devices under a condition that the parking determination portion determines that the shift lever of the one of the plurality of vehicles boarded by the user corresponds to the parking position.

7. The portable terminal according to claim 5, wherein the storage stores driving positions each of which is a seat position appropriate for the user to perform the driving operation of the corresponding one of the plurality of vehicles, the portable terminal further comprising:

a wakeup time determination portion determining whether a current time reaches a wakeup time set by a manipulation made by the user; and a driving position transmission portion reading out, from the storage, one of the driving positions corresponding to one of the plurality of vehicles boarded by the user when the wakeup time determination portion determines that the current time reaches the wakeup time, and then the driving position transmission portion transmitting the one of the driving positions which is read out to the corresponding one of the plurality of vehicular devices.

8. The portable terminal according to claim 7, further comprising:

an alarm sound output portion outputting an alarm sound from a speaker when the wakeup time determination portion determines that the current time reaches the wakeup time.

9. A vehicular device provided for each of a plurality of vehicles and automatically setting a driving position appropriate for a user to perform a driving operation by communicating with a portable terminal carried by a user, wherein the portable terminal receives inputs of sleep positions each of which is a seat position appropriate for the user to sleep in a corresponding one of the plurality of vehicles, stores the sleep positions in a storage, and transmits one of the sleep positions corresponding to the vehicle boarded by the user in response to a manipulation made by the user, the vehicular device comprising:

a sleep position setup portion receiving the one of the sleep positions from the portable terminal and automatically setting, in accordance with the one of the sleep positions, the seat position to be appropriate for the user to sleep, wherein a sleep position transmission portion transmits the one of the sleep positions to the vehicular device when a shift lever of the vehicle boarded by the user corresponds to a parking position.

* * * * *